United States Patent [19]
Iehisa et al.

[11] Patent Number: 5,151,916
[45] Date of Patent: Sep. 29, 1992

[54] ELECTRIC DISCHARGE TUBE FOR GAS LASER

[75] Inventors: Nobuaki Iehisa, Yamanashi; Etsuo Yamazaki, Hachioji, both of Japan

[73] Assignee: Fanuc Ltd., Minamitsuru, Japan

[21] Appl. No.: 474,043

[22] PCT Filed: Aug. 22, 1989

[86] PCT No.: PCT/JP89/00856
  § 371 Date: Apr. 18, 1990
  § 102(e) Date: Apr. 18, 1990

[87] PCT Pub. No.: WO90/03052
  PCT Pub. Date: Mar. 22, 1990

[30] Foreign Application Priority Data
  Sep. 9, 1988 [JP] Japan .................. 63-226994

[51] Int. Cl.⁵ .......................... H01S 3/03
[52] U.S. Cl. ........................ 372/61; 372/55; 372/64; 372/66; 372/83
[58] Field of Search .......... 372/61, 64, 66, 83, 372/55

[56] References Cited

U.S. PATENT DOCUMENTS

| | | | |
|---|---|---|---|
| 3,815,047 | 6/1974 | Smith et al. | 372/64 |
| 4,039,971 | 8/1977 | Wang et al. | 372/61 |
| 4,126,890 | 11/1978 | Fournier et al. | 372/61 |
| 4,373,202 | 2/1983 | Laakman et al. | 372/64 |
| 4,381,564 | 4/1983 | Newman | 372/64 |
| 4,512,021 | 4/1985 | Chenausky et al. | 372/64 |
| 4,620,306 | 10/1986 | Sutter, Jr. | 372/61 |
| 4,703,489 | 10/1987 | Ross | 372/64 |
| 4,785,458 | 11/1988 | Kazumoto et al. | 372/83 |
| 4,862,476 | 8/1989 | Yiming | 372/61 |

FOREIGN PATENT DOCUMENTS

| | | | |
|---|---|---|---|
| 0157277 | 8/1985 | Japan | 372/61 |
| 8806357 | 12/1987 | PCT Int'l Appl. | 372/61 |

OTHER PUBLICATIONS

Patent Abstracts of Japan, vol. 12, No. 420, (E-679) [3267], Nov. 8, 1988; & JP-A-63 158 886, (Fanuc Ltd.), Jan. 7, 1988.
Patent Abstracts of Japan, vol. 12, No. 234, (E-629) [3081], Jul. 5, 1988 & JP-A-63 27 077, (Fanuc Ltd.), Apr. 2, 1988.

*Primary Examiner*—Georgia Y. Epps
*Attorney, Agent, or Firm*—Staas & Halsey

[57] ABSTRACT

An electric discharge tube for a gas laser in which a laser gas flow axis and a laser oscillation optical axis are coaxial and a discharge direction of discharge pumping is perpendicular to those axes. The internal sectional form of a discharge tube (1) perpendicular to the laser oscillation optical axis is made rectangular and the internal diameter of nondischarge sections (10a, 10b) is made larger than the diagonal line of the discharge tube (1). The section of laser beams generated in a rectangular discharge region (11) becomes substantially rectangular in shape and the laser beams are externally output intact, whereby a substantially rectangular beam mode is obtained.

7 Claims, 5 Drawing Sheets

ELECTRIC DISCHARGE TUBE FOR GAS LASER

BACKGROUND OF THE INVENTION

1. Field of the Invention

The present invention relates to an electric discharge tube for high-speed axial-flow discharge pumping type gas lasers utilizing a high-frequency electric discharge, and more particularly, to an electric discharge gas laser tube providing a laser light in a rectangular beam mode.

2. Description of the Related Art

Recent developments in high-power lasers and peripheral processing technologies have enabled a wider use of laser beams for welding metals and nonmetals and for surface treatment processes in industry. However, a circular beam mode cannot be used to obtain a uniform processing accuracy, and thus a rectangular beam mode is required for such applications.

FIG. 4 is a schematic illustration of a conventional electric discharge tube for a gas laser. In the Figure, 21 designates a discharge tube, 22a and 22b denote metal electrodes, and 23 designates a high-frequency power source which supplies a high-frequency power of 2 MHz to a fast-flowing laser gas 24 in a discharge tube 21, via the metal electrodes 22a and 22b.

The sectional form of a laser beam output from the gas laser discharge tube is circular, as designated by 24 in FIG. 5(a), and thus the transverse mode is approximately represented by a Gaussian mode as shown by 25 in FIG. 5(b).

Therefore, to carry out a welding and surface treatment processing (e.g., surface hardening), an operation is required to convert the circular beam mode to a rectangular beam mode, and usually this is effected by the use of a paraboloid converging mirror, called a segmented mirror, disposed at the end of a processing head. An example of this is disclosed in a Japanese Unexamined Patent Publication No. 63-77178.

The segmented mirror, however, is arranged such that a large number of small plane mirrors are disposed on a parabolic surface, and thus is very expensive due to its intricate shape.

SUMMARY OF THE INVENTION

In view of the disadvantages of the prior art described above, an object of the present invention is to provide an electric discharge tube for a gas laser in which the sectional form of an active medium region, which contributes to a laser oscillation, is made rectangular, thereby to provide a laser light in a rectangular beam mode.

To attain the above object, according to the present invention, there is provided an electric discharge tube for a gas laser in which a laser gas flow axis and a laser oscillation optical axis are coaxial, and a discharge direction for discharge pumping is perpendicular to those axes, characterized in that the internal sectional form of the discharge section perpendicular to the laser oscillation optical axis is made rectangular and that the internal diameter of the nondischarge section is made larger than the diagonal line of the discharge section.

The internal sectional form of the discharge section is made rectangular and the nondischarge section is formed with an internal diameter larger than that of the discharge section. The sectional form of a laser beam generated in the rectangular discharge region becomes substantially rectangular, and since the laser beam is output to the outside as it is, a substantially rectangular beam mode is obtained.

DETAILED DESCRIPTION OF THE PREFERRED EMBODIMENTS

An embodiment of the present invention will be described below with reference to the accompanying drawings.

Figure 2A:
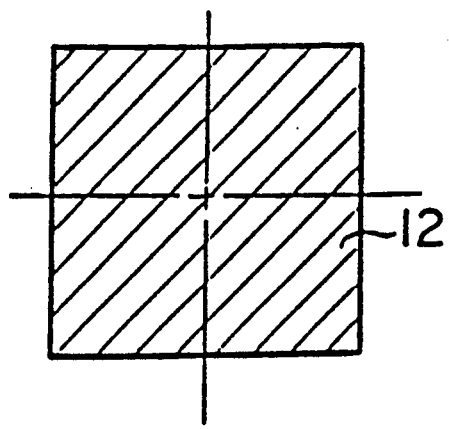
FIG. 2(a) illustrates the sectional form of a laser beam provided by the gas laser discharge tube according to the embodiment of the present invention.
Figure 2B:
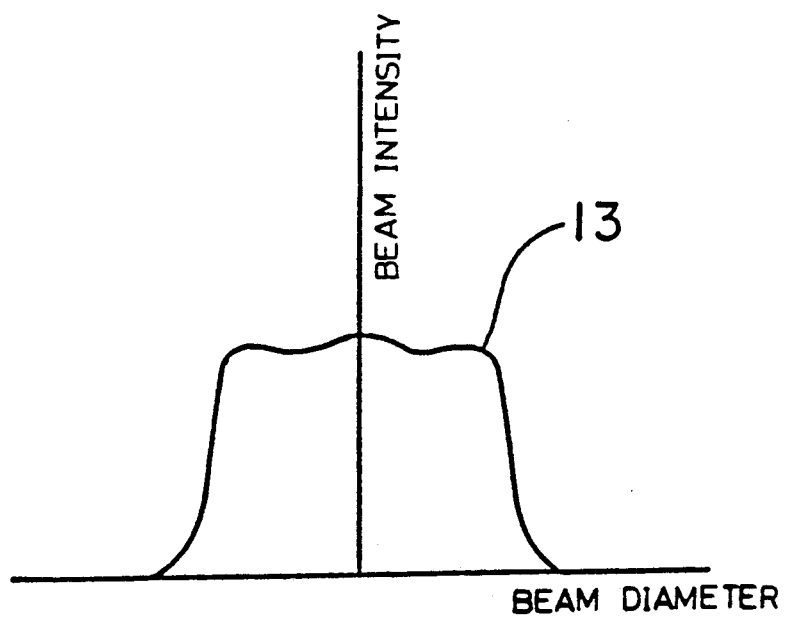
FIG. 2(b) is a diagram illustrating the transverse mode of the laser beam provided by the gas laser discharge tube according to the embodiment of the present invention.
Figure 3:
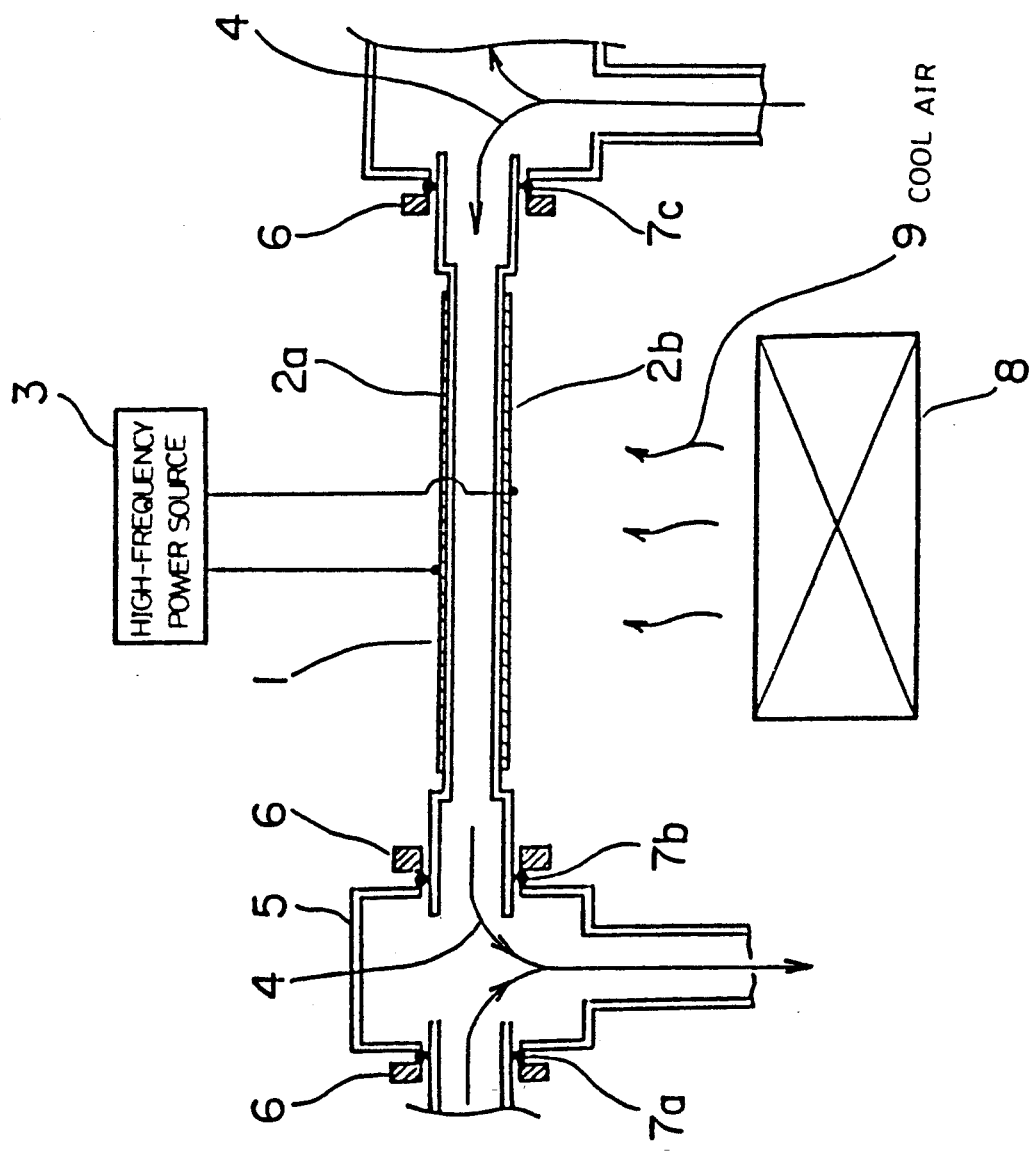
FIG. 3 is a schematic diagram of a peripheral section incorporating the gas laser discharge tube according to the embodiment of the present invention.
Figure 4:
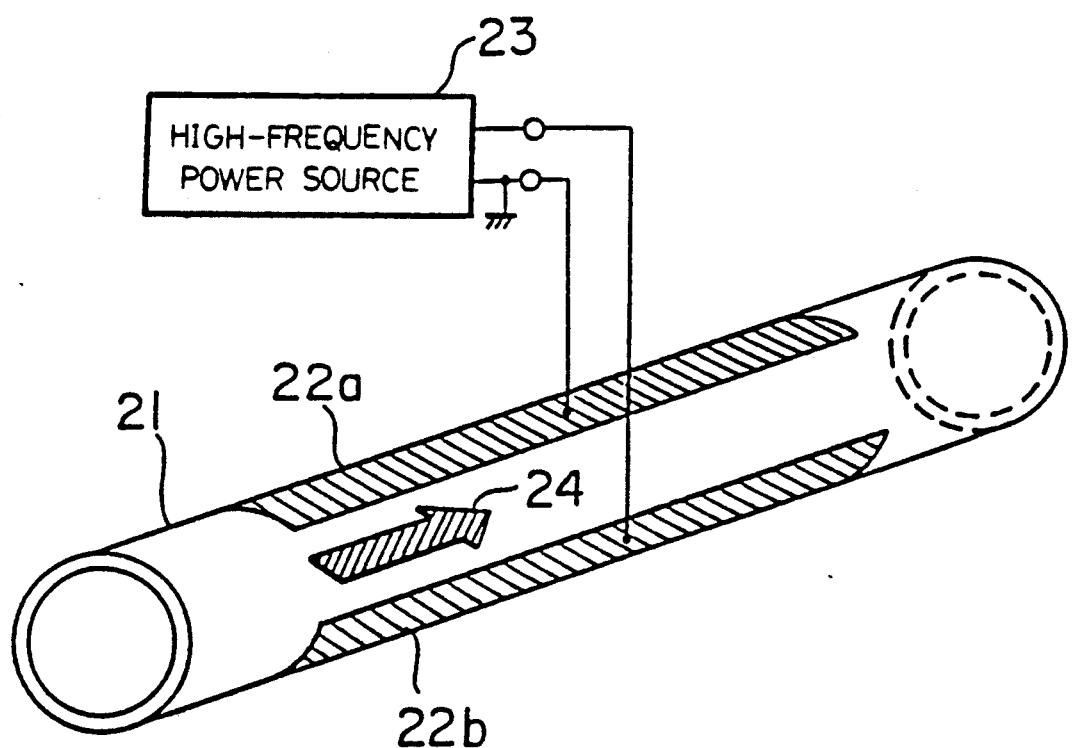
FIG. 4 is a schematic diagram of a prior art gas laser discharge tube.
Figure 5A:
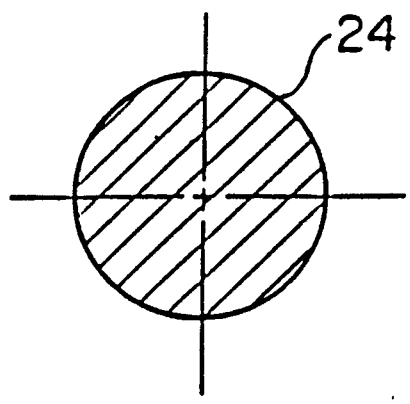
FIG. 5(a) illustrates the sectional form of a laser beam provided by the prior art gas laser discharge tube.
Figure 5B:
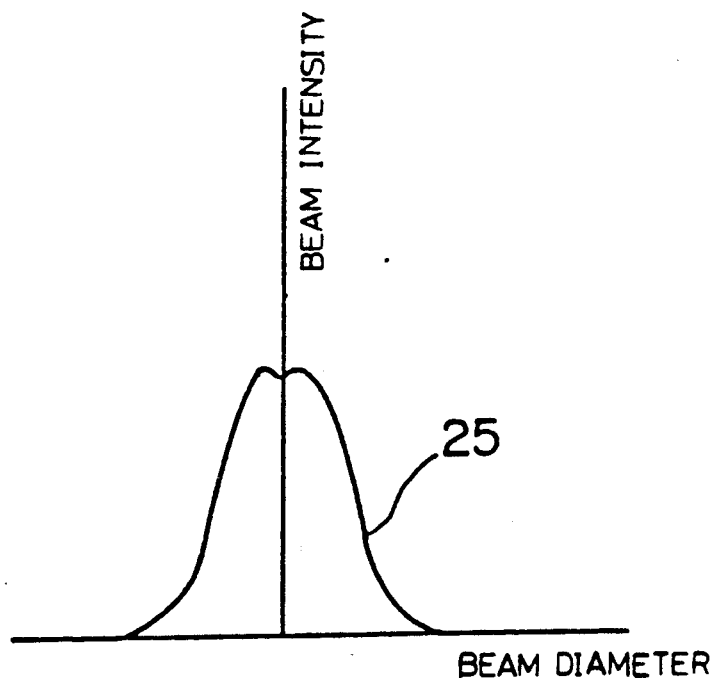
FIG. 5(b) is a diagram illustrating the transverse mode of the laser beam from the prior art gas laser discharge tube.

FIG. 3 is a schematic diagram of a peripheral portion incorporating an electric discharge tube for a gas laser according to an embodiment of the present invention. In the FIG., 1 designates an electric discharge tube, which will be described later in detail with reference FIGS. 1(a) and 1(b), 2a and 2b designate metal electrodes, 3 designates a high-frequency power source which supplies a high-frequency electric power to a fast-flowing gas 4 in the discharge tube 1, 5 designates discharge tube holders, 6 denotes fixed flanges, and 7a, 7b and 7c denote O-rings made of a rubber material. The discharge tube is held by these holders, flanges and rings.

Reference numeral 8 designates a water cooled radiator unit which supplies cool air 9 to the discharge tube 1 to cool same. In FIG. 3, the optical parts required for generating laser beams, a Roots blower for circulating the laser gas 4, and so on, are omitted.

Figure 1B:
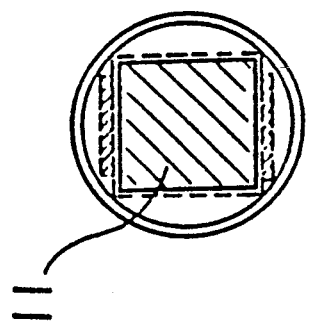
FIG. 1(b) is a side view of the discharge tube of FIG. 1(a)
Figure 1A:
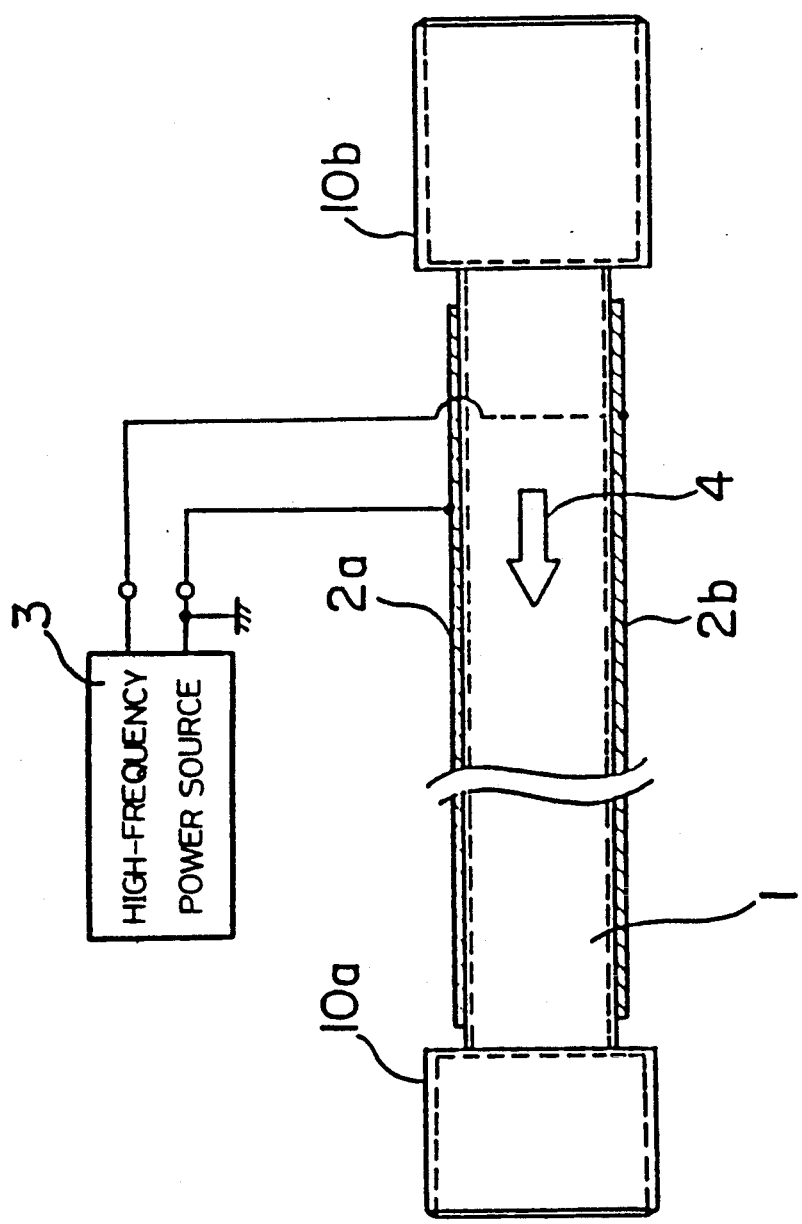
FIG. 1(a) is a schematic diagram of an electric discharge tube for a gas laser according to an embodiment of the present invention.

FIG. 1(a) is a schematic diagram of the gas laser discharge tube according to an embodiment of the present invention and FIG. 1(b) is a side view of the tube. In FIG. 1(a), an electric discharge tube 1 is formed of a pipe made of glass quartz and having a rectangular section. The tube is 19 mm × 19 mm in internal diameter and 2.5 mm in thickness, and the metal electrodes 2a and 2b are provided on the outer sides of the discharge tube 1, whereby the tube walls are used as a capacitive load. Reference numeral 3 designates a high-frequency power source and 4 a laser gas flow.

Reference numerals 10a and 10b designate nondischarge sections for fixing the discharge tube 1 to the fixed flanges. The nondischarge sections are made larger than the discharge section 11, as shown in FIG. 1(b). Specifically, the nondischarge section is a cylinder 38 mm in internal diameter and 42 mm in outer diameter and made of quartz glass, as is the discharge tube 1.

FIG. 2(a) illustrates the sectional form of a laser beam output from the discharge tube, by the numeral 12. As described above, since the discharge region is rectangular in shape, the sectional form of output laser beams also becomes substantially rectangular. Accordingly, the transverse mode of the laser beams is represented by a substantially rectangular shape suitable for welding and a surface treatment, as shown by 13 in FIG. 2(b).

Although in the above embodiment the sectional form of the discharge section is shown as a square, a non-square rectangular sectional form may be used instead.

According to the present invention, as described above, a laser beam output from a discharge tube is substantially rectangular in shape, and thus welding and a surface treatment can be carried out using a simple converging lens or mirror instead of an expensive paraboloid converging mirror. Therefore, the construction of an external optical system is simplified and the cost thereof reduced.

Also, laser beams produced within the discharge tube are externally output as they are without using a diaphragm, thus improving the efficiency of the device.

We claim:

1. An electric discharge tube for a gas laser in which a laser gas flow axis and a laser oscillation optical axis are coaxial and a discharge direction for discharge pumping is perpendicular to said axes, comprising:
   a discharge section made of quartz glass and having two opposite axial ends, an internal cross-sectional shape of said discharge section being square and measuring approximately 19 mm by 19 mm; and
   a non-discharge section disposed at each opposite axial end of said discharge section for supporting the discharge section;
   an internal sectional form of said discharge section perpendicular to the laser oscillation optical axis is made rectangular and an internal diameter of said non-discharge section is made larger than a diagonal line extending across a cross-section of said discharge section.

2. A laser discharge tube for outputting a rectangular laser beam comprising:
   a discharge portion made of quartz glass and having an internal rectangular cross-sectional shape defining an internal cross-sectional area and two opposite axial ends; and
   non-discharge end portions attached to the two opposite ends of the discharge portion and having a larger internal cross-sectional area than that of the discharge portion.

3. A laser discharge tube according to claim 2, further comprising a pair of opposed electrodes provided on outer, opposite sides of the discharge portion connectable to a high-frequency power source.

4. A laser discharge tube according to claim 2, wherein the discharge portion has an internal rectangular cross-sectional square shape measuring about 19 mm by 19 mm.

5. A laser discharge tube according to claim 2, wherein the discharge portion has four sides defining four exterior surfaces, and the discharge tube further includes first and second electrodes, each being disposed on one of two opposite outer surfaces of the discharge portion.

6. An electric discharge tube for a gas laser in which a laser gas flow axis and a laser oscillation optical axis are coaxial and a discharge direction for discharge pumping is perpendicular to said axes, comprising:
   a discharge section made of quartz glass and having two opposite axial ends, and a non-discharge section disposed at each opposite axial end of the discharge section for supporting the discharge section; and
   wherein the discharge portion has four sides defining four exterior surfaces, and the discharge tube further includes first and second electrodes, each being disposed on one of two opposite outer surfaces of the discharge portion.

7. An electric discharge tube for a gas laser in which a laser gas flow axis and a laser oscillation optical axis are coaxial and a discharge direction for discharge pumping is perpendicular to said axes, comprising:
   a discharge section made of quartz glass and having two opposite axial ends; and
   a non-discharge section disposed at each opposite axial end of said discharge section for supporting said discharge section, said non-discharge section being made of the same material as said discharge section and having a circular cross-sectional shape having an internal diameter of approximately 38 mm, an internal sectional form of said discharge section perpendicular to the laser oscillation optical axis is made rectangular and the internal diameter of said non-discharge section is made larger than a diagonal line extending across a cross-section of said discharge section.

* * * * *